July 15, 1969  J. ZINK  3,455,357
SCREEN CHANGER APPARATUS FOR EXTRUSION MACHINES
Filed Feb. 3, 1967  5 Sheets-Sheet 1
FIG. 1
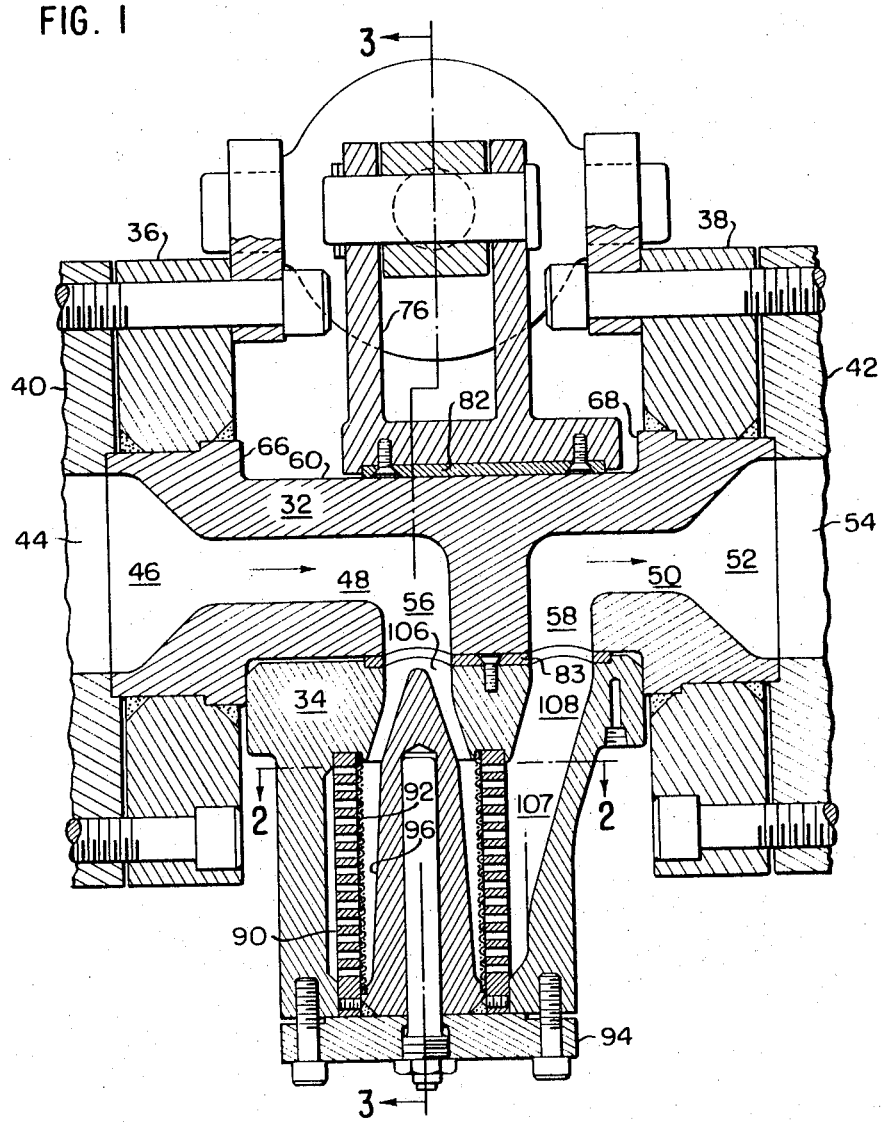
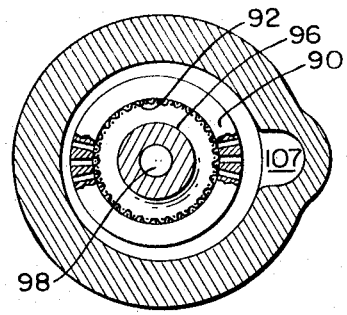
FIG. 2
INVENTOR.
JULIUS ZINK
BY
ATTORNEYS July 15, 1969    J. ZINK    3,455,357
SCREEN CHANGER APPARATUS FOR EXTRUSION MACHINES
Filed Feb. 3, 1967    5 Sheets-Sheet 2

INVENTOR.
JULIUS ZINK
BY
ATTORNEYS

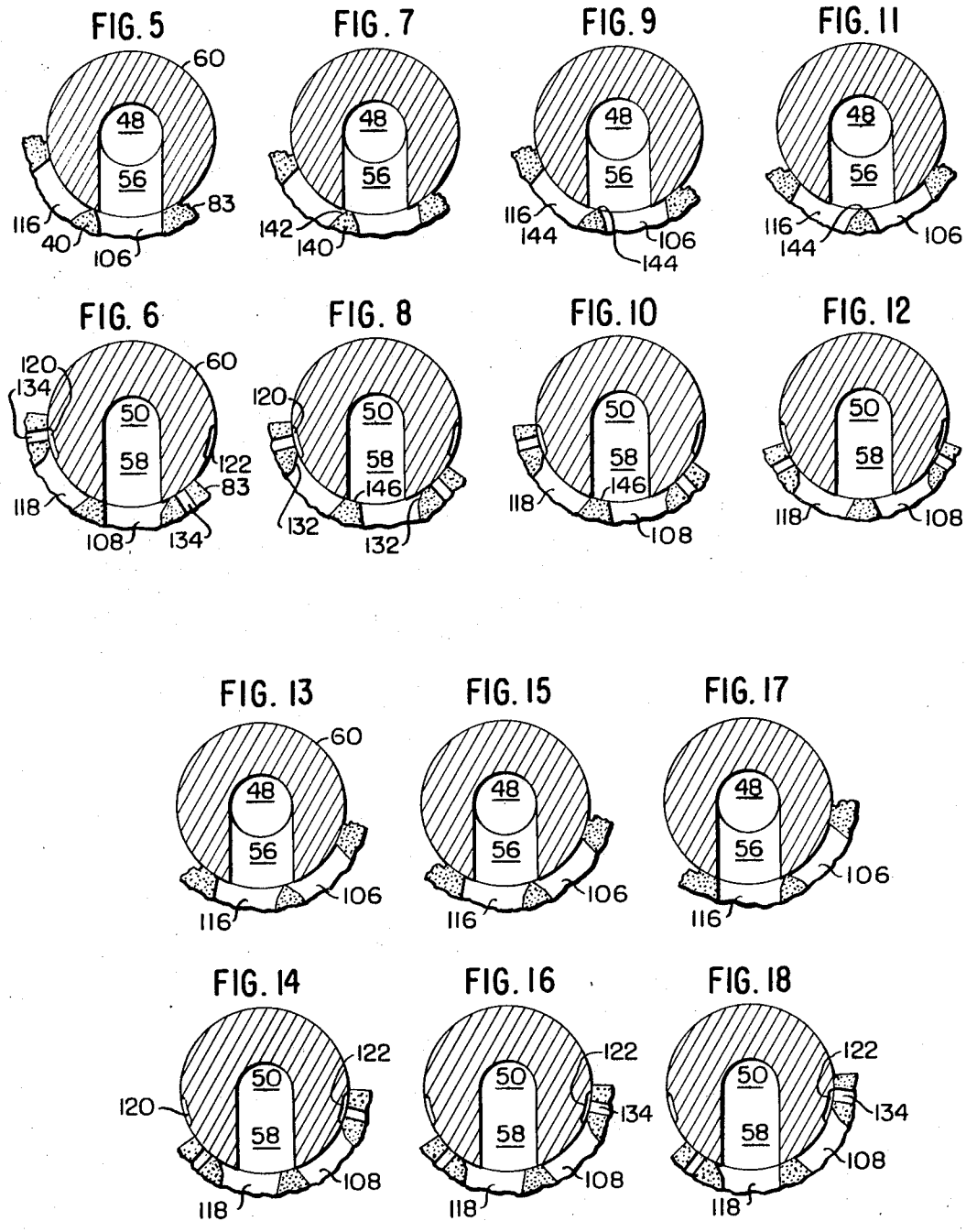

July 15, 1969   J. ZINK   3,455,357
SCREEN CHANGER APPARATUS FOR EXTRUSION MACHINES
Filed Feb. 3, 1967   5 Sheets-Sheet 5

INVENTOR.
JULIUS ZINK
BY *Kenway Jenney*
  *& Hildreth*
ATTORNEYS

United States Patent Office 3,455,357
Patented July 15, 1969

3,455,357
SCREEN CHANGER APPARATUS FOR
EXTRUSION MACHINES
Julius Zink, Marblehead, Mass., assignor to C. J. Beringer Co., Inc., Marblehead, Mass., a corporation of Illinois
Filed Feb. 3, 1967, Ser. No. 613,909
Int. Cl. B07b 1/00; B29f 3/01
U.S. Cl. 146—174  22 Claims

ABSTRACT OF THE DISCLOSURE

Screen changer apparatus, used with extruders of elastomeric materials, in which a movable screen carrier is provided with ports that communicate with the flow passages in the body of the apparatus to connect one or another of the screens into the flow path as the carrier is shifted. The ports and passages have configurations that provide automatic filling and pressure relief for the screen chambers at the proper times in the changeover cycle, without requiring additional ports and passages for the purpose.

BACKGROUND OF THE INVENTION

The present invention relates to screen changer apparatus for use with extruders of thermoplastic materials and more particularly to apparatus employing a movable screen carrier having integral valving.

In extruding elastomeric materials into films and filaments, it is generally essential to provide filtering means in the form of a screen or strainer between the extruder and the die in order to prevent foreign matter, such as carbonized polymers, hard particles of metal or non-thermoplastic material as a result of contamination of virgin material or the reuse of plastic scrap, from reaching the die and clogging the aperture or apertures, or contaminating the end product. During operation of the extruder, a screen gradually becomes filled with intercepted material, with the result that the pressure drop across the screen becomes so great as to interfere with the proper carrying out of the extruding process.

As a consequence, existing screen apparatus generally is provided with more than one screen, with the apparatus so arranged so that when one screen becomes clogged to the point where cleaning is necessary, the clogged screen may be shifted out of the flow path and a clean screen moved into its place and the extruding operation resumed. In the meantime, before the next changeover, the clogged screen will be removed, cleaned and replaced, ready to be shifted into the flow line when the need arises.

While many different forms and arrangements of screen changer apparatus have been proposed and employed in an effort to improve the screening effectiveness during flow and to minimize interruptions and discontinuities resulting from changeover, existing constructions have not been wholly successful. It has been found particularly difficult to carry out a screen changeover without interrupting the flow of material, resulting in discontinuities in the strands or web drawn from the die. Even if the changeover is conducted, as a result of the skill of the operator, so that there is no apparent interruption in the flow of plastic to the die, there is likely to be an irregularity in the product due to failure to maintain the proper temperature, flow and pressure of the material when the material through the clean screen first comes on stream.

The present invention therefore has as an object the provision of screen changer apparatus of novel construction and arrangement, wherein the screen-changing operation may be carried out automatically and in such fashion that no interruption in the flow of plastic occurs, and with little if any variation in pressure and temperature so that the extruded product may have a high degree of uniformity throughout an extended production run involving numerous changes in the screens and cleaning operation thereon.

More particularly the invention has as an object the provision of screen changer apparatus so constructed and arranged that the screen changing operation automatically effects diversion of the flow from one screen to another via short flow paths which provide no inactive regions or dead zones where some of the plastic may remain dormant and be subject to charring by reason of the sustained elevated temperature.

Another object of the invention is to provide screen changer apparatus that is of relatively simple and compact construction that requires minimum space between the extruder mechanism and the die, and likewise avoids extended and devious flow passages.

SUMMARY OF THE INVENTION

In furtherance of these and other objects, the invention comprises, as one of its features, screen changer apparatus employing a plurality of screens, each of substantial effective area, the screens being disposed in separate chambers associated with a screen carrier, the carrier being supported on a central body having axial inlet and outlet passages, there being cooperating flow passages or ports in the central body and carrier so that upon shifting the carrier, one of the screens may be placed in the flow path of the plastic and another screen disconnected from the flow path with the sequence of flow changeover completely controlled by the motion of the carrier and the valving action of the cooperating flow passages.

More particularly, one of the features of the invention involves the provision of porting configurations in the changer body and movable screen carrier such that the initial movement of the screen carrier in a changeover cycle serves automatically to vent the chamber containing the clean screen and cause it to be filled with plastic, without requiring a separate valve or removal of elements to open a vent. As the changeover cycle proceeds, the vent is closed, the clean screen placed on stream and the chamber containing the screen to be cleaned then cut off from both the inlet and outlet passages. As a final step in the sequence, the latter chamber is then vented to allow the pressure to bleed off so that the chamber may safely be opened for removal of the screen.

DESCRIPTION OF THE DRAWINGS

FIG. 1 is a longitudinal sectional view of a preferred embodiment of the invention.

FIG. 2 is a sectional detail through a screen chamber, taken on the line 2—2 of FIG. 1.

FIGS. 5 through 18 are views illustrating the relationship of the flow ports at different stages in the movement of the screen carrier during the changeover from one screen to another. The odd-numbered views show the porting at the inlet to the screen carrier, while the even-numbered figures show the port relationships between the outlet from the screen carrier and the discharge passage in the changer body.

DESCRIPTION OF THE PREFERRED EMBODIMENTS

A screen changer apparatus wherein the screen carrier is mounted on the apparatus body for rotational swinging movement around said fixed body will first be described, according to a preferred embodiment thereof.

Figure 4:
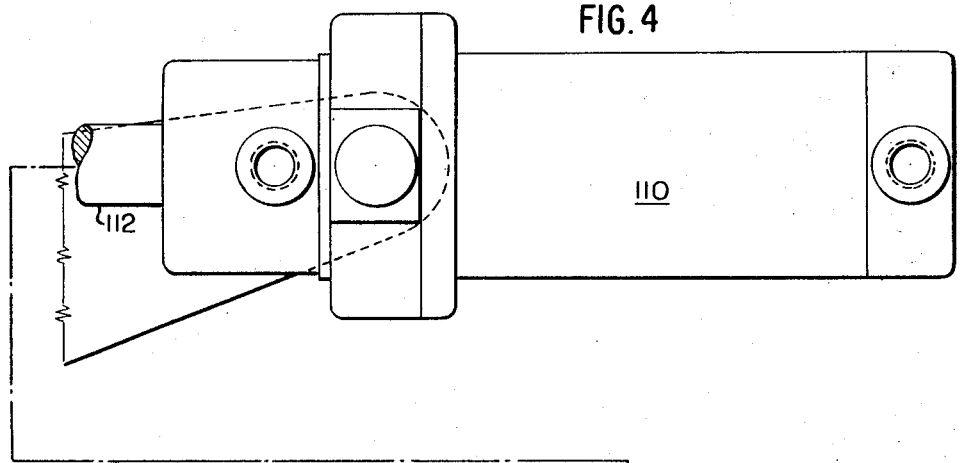
FIG. 4 shows the portion of the actuating mechanism for effecting screen changeover, which was omitted from FIG. 3 for reasons of space.
Figure 3:
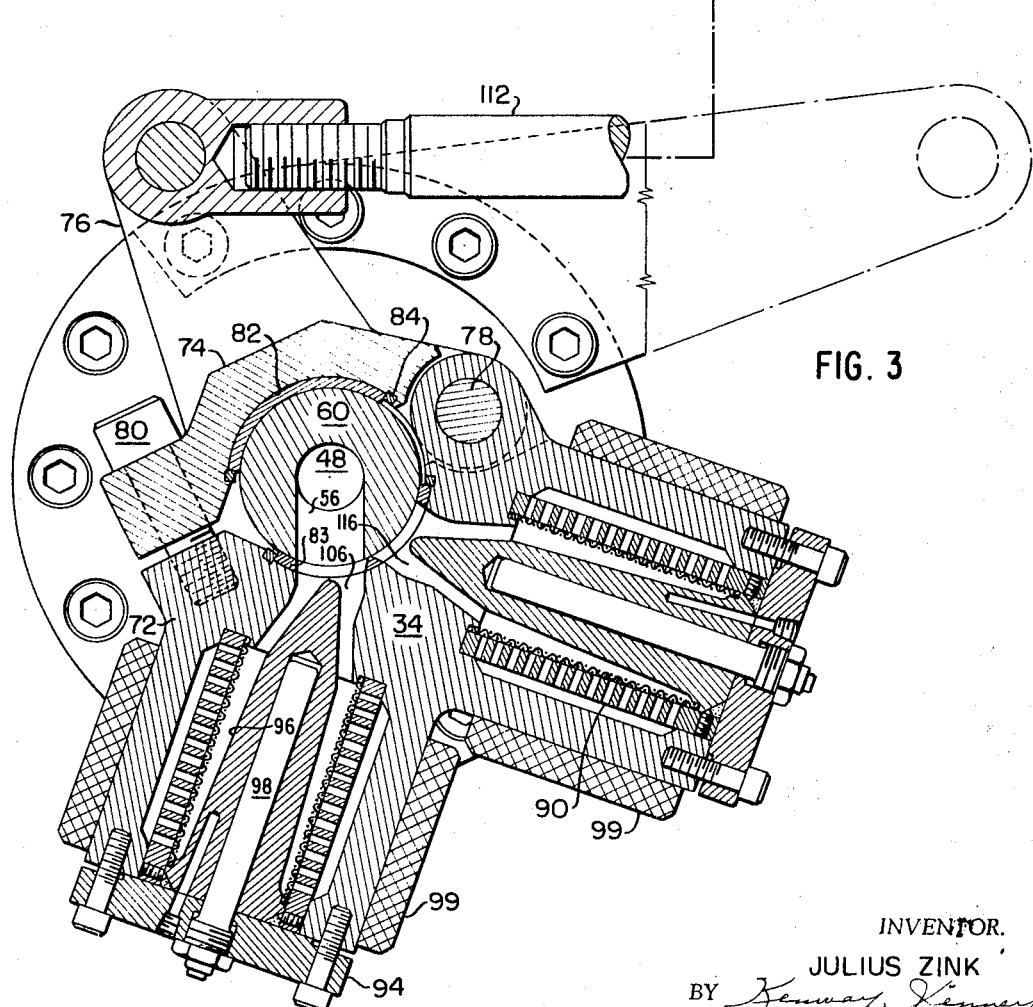
FIG. 3 is a transverse sectional elevation of the apparatus shown in FIG. 1, as viewed from the right side.

Referring initially to FIGS. 1, 2 and 3, the fixed body of the apparatus is indicated generally at 32 and the movable screen carrier at 34. The fixed body is provided with end flanges 36 and 38 by which the apparatus may be secured between the flange 40 of the extruder and the flange 42 of the extrusion die.

The inlet portion of the body 32 has an inlet passage which registers with the flow passage 44 from the extruder and converges in the region 46 to a smaller diameter passage 48 to increase the flow velocity. In the outlet portion of the body, the outlet passage 50 in the region 52 adjacent the inlet to the extrusion die preferably is sized to match the die inlet; in the illustrative embodiment the outlet region 52 is shown as diverging to the diameter of inlet 54. To communicate with the screen chambers in the carrier, the axially-aligned inlet and outlet passages 48 and 50 within the body turn to connect with short portions that terminate in circular ports 56 and 58 disposed in side by side relation on the periphery of the cylindrical central portion 60 of the body 32. This cylindrical portion preferably has a diameter somewhat smaller than the end portions 66, 68 on which are mounted the flanges 36, 38 (secured by welding or other suitable means). The portions 66, 68 thus provide shoulders that function as guides for the screen carrier to be described.

The screen carrier 34, best shown in sectional configuration in FIG. 3, is mounted on the cylindrical center portion 60 of the fixed body, and is provided with screen chambers which extend outwardly in generally radial directions, shown spaced approximately 90° apart though other angular spacings may be employed. Through the cooperation of screen carrier ports which register with the ports 56, 58 in the fixed body, one or another of the screen chambers may be connected into the flow path by simple swinging movement of the carrier around the body, so as to place a clean screen on line and permit a clogged screen to be removed and cleaned. As viewed in FIG. 3, the portion of the carrier which surrounds and engages the fixed body is of two-piece construction so as to allow convenient assembly and removal. The lower, main portion 72 contains the screen chambers and their connecting passages, while the upper portion comprises the cap piece 74 and integral arms 76 for the power drive by which the carrier is swung from one operating position to the other. The cap piece is connected to the main body of the carrier by a hinge pin 78 at one end and a removable bolt or bolts 80 at the other. By proper adjustment of the bolt, the sliding engagement between the parts may be made leak free, and still within the capabilities of the power actuator for the carrier. Arcuate bushings 82 and 83 of bronze or other suitable material, held in place in the carrier by small filler keys 84 or by other suitable means, enable dissimilar low-friction materials to be in sliding contact at the interface.

The screens and screen chambers will now be described. The screens are cylindrical, with relatively thick-walled perforated supports 90 for the screen mesh 92 on the interior wall. One end of the cylinder is detachably mounted on the chamber cover plate 94 so as to be withdrawn from the chamber when the cover is unclamped and removed. A tapered plug 96, secured to the cover plate, assists in distributing the flow of plastic within the cylindrical screen to make effective use of the whole screen area. A heating element 98 may be mounted within this plug, while other heaters 99 jacket the screen chamber walls.

During operation of the apparatus, the extrudate flows from passage 44 into the converging region 46 and at increased velocity moves along the axial portion 48 of the inlet passage through the port 56 in the fixed body and registering port 106 for the inlet to the screen chamber shown in FIG. 1. After passing through the screen mesh, the screened extrudate flows along passage 107 to the discharge port 108 on the carrier and through port 58 in the fixed body to the outlet 52 and die 42. With continued operation, the on-line screen gradually becomes clogged and the pressure drop increases to a point where a clean screen must be placed in operation. By means of a fluid-powered actuator 110 or other suitable means, the output member 112 of which is connected to the arms 76, the screen carrier is shifted around the fixed body to place the inlet port 116 for the second screen chamber in registry with the port 56, and the discharge port 118 in registry with the port 58. With the second screen on-line, the first screen chamber may be opened and the screen removed for cleaning and replacement.

The foregoing description sets forth in general the changeover from one screen chamber to the other. In the present invention, an important feature is the provision of means, effective during the changeover sequence, by which the transition from one screen to another may be made not only without interruption in the flow of extrudate, but also without significant variations in temperature and pressure. As a result, the extruded product remains extremely uniform throughout an extended production run in spite of repeated screen changes. This improved operation is brought about in large part by special port configurations which insure that venting and preliminary filling of a fresh screen chamber, and release of pressure in the clogged screen chamber, take place automatically and in proper timed relation during the changeover.

To provide the desired valve action during the changeover sequence from one screen to the other, the body 60 is provided with bypasses in the form of shallow recesses 120 and 122 in the periphery of the body. These recesses lie on a circle which runs through the center of the outlet port 58 and are equidistant from said port on each side thereof.

To cooperate with these bypass recesses 120 and 122, the edges of the arcuate bushing 83 in the screen carrier ports 108 and 118 are notched or bevelled at 132 at their outer margins so as to register with the recesses in the limit positions of the carrier. As a result, when one screen chamber is in use and the extrudate is flowing from the chamber through registering ports in carrier and body to the outlet passage 50, the other screen chamber, whose discharge port is closed by the body, may be vented to atmosphere by the recess, one end of which registers with and is exposed by the beveled notch or cutaway portion 132 of the screen carrier port at the interface between carrier 34 and body 60. The other end of the recess is open to a vent passage 134 through bushing 83 and screen carrier body 72 and discharging to atmosphere.

The cooperating inlet ports in body and carrier also have a special configuration to provide automatic filling of the empty screen chamber just prior to going on stream during a changeover. For this purpose the portion of the bushing which separates the inlet ports 106 and 116 in the screen carrier is bevelled or notched at 142 so that the land 144 between said notches is narrower than the land 146 between the carrier outlet ports 108 and 118. This relationship, illustrated in FIGS. 7 and 8, makes it possible for a partial flow of extrudate to take place from inlet 56 through notch 142 into the empty screen chamber while the main flow to the on-line chamber via port 116 continues substantially undiminished. At the same time, the chamber containing the clean screen remains vented to atmosphere by way of the still-exposed bypass recess 120 while flow to the discharge passage 58 continues blocked due to the greater width of land 146 between the discharge ports 108 and 118.

These port configurations and their operation will now be described in conjunction with the series of views shown in FIGS 5–18, which illustrate the port relationships during a changeover from the first screen to the second screen (in FIG. 3, the first screen is shown in operating position and the second screen is in standby position).

Starting with FIGS. 5 and 6, the first screen is in full operation, with its inlet port 106 in full registry with the port 56 in the fixed body 60 and the discharge port 108 registering with port 58. The discharge port 118 for the second screen chamber is closed, but the chamber is vented to atmosphere by way of bypass recess 120, so as to permit opening the chamber for screen cleaning and replacement.

Upon an increase in pressure drop across the screen changer apparatus beyond a predetermined amount, the fluid-powered cylinder 110 or other suitable power actuator, will be actuated, either by manual control means or by automatic means responsive to a signal derived from the pressure increase upstream of the screen, to move the screen carrier around the body to the position shown in FIGS. 7 and 8. Here, as has already been indicated, the flow through the on-line screen remains substantially unaffected, but the chamber containing the clean screen now begins to fill due to some flow of extrudate past the small gap between the edge of port 56 and notch 142 into port 116. Venting to accommodate the filling of the chamber is available through the bypass recess 120 and vent passage 134.

Preferably the movement of the screen carrier will be controlled to provide a slight dwell in the position shown in FIGS. 7 and 8, until the clean screen chamber has been filled with extrudate. As soon as this occurs, either as evidenced by the appearance of plastic outwardly of the carrier at the open end of the vent passage 134 or on the basis of completion of a predetermined time interval, motion of the screen carrier resumes to complete the changeover.

In FIGS. 9 and 10, the clean screen chamber vent has closed, by reason of the end of recess 120 reaching the land beyond the notched region 132 of port 118. The port 118 is still closed to port 58, so the pressure in the clean screen chamber now builds up to the full supply pressure, before going on line.

At the stage represented by FIGS. 11 and 12, the discharge port 118 for the clean screen chamber has opened to the discharge passage 50 in the body and the clean screen is now in partial operation, sharing the flow with the screen that has been in use, as a result of the half-way position of the carrier.

In the remaining views of the sequence, the clean screen gradually takes over the entire flow, while the used screen is cut off. FIG. 14 shows the closing of the discharge port 108 for the used screen, and in FIG. 16 the beginning of the venting or blowdown, at first gradual and then complete, as provided by the limit position, FIG. 18. In the meantime, the supply to the inlet side has become complete, with full registry of the inlet ports 56, 116 to the clean screen chamber.

It is thus apparent that the use of the single pair of ports in the fixed body of the changer and the cooperating pairs of ports in the movable carrier to provide the entire valving action for all flow and venting steps in each changeover operation, serves to maintain within close limits the pressure and temperature of the extrudate reaching the die. With such precision insured by the simple and direct valve action, it becomes entirely practical to make the changeovers take place automatically and thereby achieve long production runs without interruption and with a minimum of attention.

The same advantageous features may be provided in screen changer apparatus employing a screen carrier that is movable in linear rather than rotational relation to the fixed body of the apparatus. Such an embodiment is illustrated in FIGS. 19 and 20, showing the structure, and FIGS. 21–27, showing the port configurations and their relationships at various stages during a changeover of screens.

Figure 19:
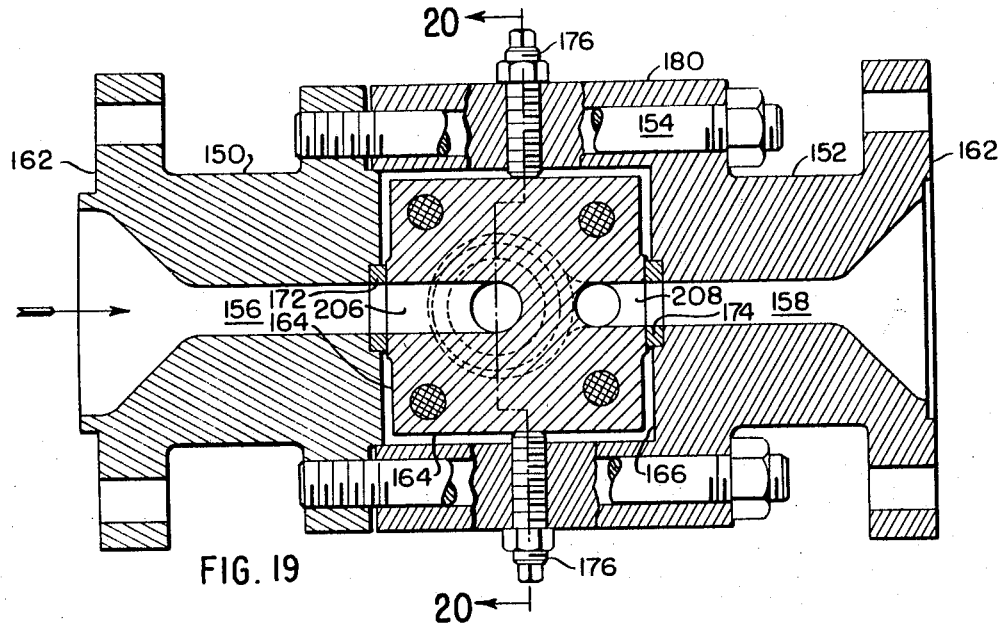
FIG. 19 is a longitudinal sectional view of an alternate construction wherein the screen carrier is arranged for transverse sliding movement relative to the changer body.
Figure 20:
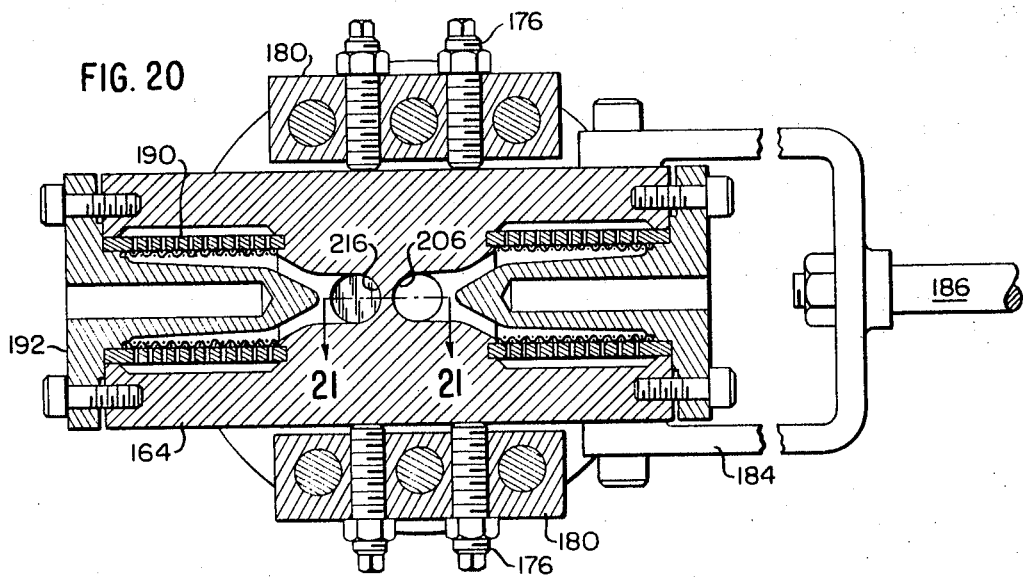
FIG. 20 is a transverse sectional view of the apparatus shown in FIG. 19, taken on the line 20—20 of said figure.

Referring first to FIGS. 19 and 20, the fixed body is of two-piece construction, involving an inlet section 150 and an outlet section 152 joined by clamp bolts 154 and having aligned inlet and outlet passages 156 and 158. Flanges 162 at each end of the apparatus provide connection to extruder and die, not shown.

The screen carrier 164 is in the form of an elongated block of square or rectangular section, or of circular section if desired, mounted in a passage between the spaced inner ends 166 of the body sections 150 and 152 for sliding movement transversely of the flow passages 156, 158 therein. Bearing plates or bushings 172 and 174 of bronze or other suitable material provide a sliding sealing engagement between carrier 164 and the body in the region of the ports to be described. Adjustable studs 176 mounted in the underlying and overlying portions 180 of the body serve to guide the carrier at the proper height for accurate registry of the ports. A yoke 184 connected by rod 186 to a fluid-powered or other suitable actuator, not shown, serves to shift the carrier transversely of the body under the guidance provided by the engagement of sealing bushings 172 and 174 against the sides of the carrier and by the end faces of the studs 176 with the top and bottom surfaces of the carrier.

The disposition of the screens and screen chambers within the screen carrier 164 is shown in FIG. 20. As in the embodiment shown in FIGS. 1–4, the screens comprise a cylindrical assembly of a perforated support 190 with a screen of appropriate mesh size secured to the inner surface thereof. The screen assemblies are carried on the removable cover plates 192 which include conical plugs to aid in distributing the flow of extrudate axially within the screens, as described in conjunction with the screens and screen chambers illustrated in FIG. 3.

The port and passage configuration within the movable screen carrier is shown in detail in FIGS. 21–27 and will now be described. These figures are sectional details in plan view, taken in the region represented by the line 21—21 of FIG. 20, with which FIG. 21 corresponds. The inlet passage in the fixed body is shown at 156, and the outlet passage at 158. The carrier is at the limit of its left hand movement, so that the port 206, through which the material from the extruder flows to the right hand screen chamber, registers with the inlet 156. The extrudate after passing through the screen flows to the outlet passage 158 by way of registering port 208. The ports 216, 218 for the second screen chamber are disposed alongside the ports 206, 208 for the first screen chamber, so that the distance the carrier is required to be shifted, for a screen changeover, is relatively short.

The cooperating ports in the fixed body and the movable carrier are formed with special configurations to provide the venting, filling and blowdown steps at the proper times in each changeover operation, with the same advantageous results that are provided by the port configurations in the first-described embodiment of FIGS. 1–18.

The venting is provided by the recesses 220, 222 which are formed in the bushing or bearing plate 174 beyond the discharge port 158. To cooperate with these by-pass recesses, the edges of the carrier ports 208, 218 are notched or bevelled at 232 at their outer margins (corresponding to the notches 132 shown in FIGS. 5–18) so that when one screen chamber is in full operation, as in FIG. 21, the discharge port for the other screen chamber communicates with the bypass recess which is exposed by the notched edge 232. The inactive screen chamber is thereby vented to atmosphere through passage 234 which extends from the recess through the body 154 to its exterior.

Figure 22:
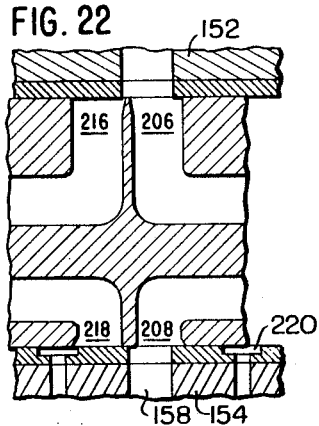
Figure 26:
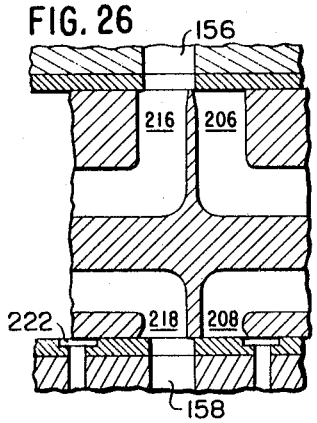

In the region of the carrier inlet ports 206, 216, the portion 240 of the carrier between said ports is notched or bevelled at 242 so that the land 244 which separates the ports 206, 216 in this region is narrower than the land 246 separating the carrier outlet ports 208, 218. This configuration serves, during the initial phase of a changeover operation, to divert a partial flow of extrudate into the chamber containing the clean screen while said chamber is being vented by way of the exposed by-pass recess, as illustrated in FIGS. 22 and 26.

Figure 21:
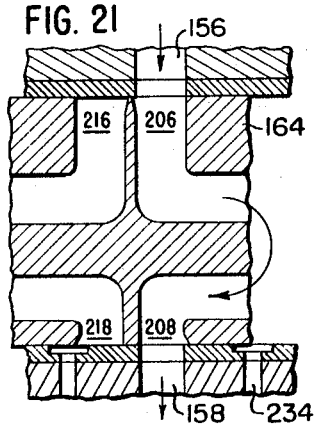
FIGS. 21–27 are sectional details taken in the region of the flow control ports in screen carrier and changer body in the apparatus illustrated in FIGS. 19 and 20, showing the porting relationships at particular stages in the screen-changing sequence.

With the port configuration as shown and described, the sequence of steps during a screen changeover is similar to that of FIGS. 5–18. FIG. 21 shows the right hand screen in full operation, with the inlet port to the left hand screen chamber completely closed but the chamber vented to atmosphere so that the chamber may safely be opened for replacement of a clean screen. Upon starting a changeover, the initial movement of the carrier to the right to the position shown in FIG. 22 starts the filling of the clean screen chamber, during which time the vent remains open.

Figure 23:
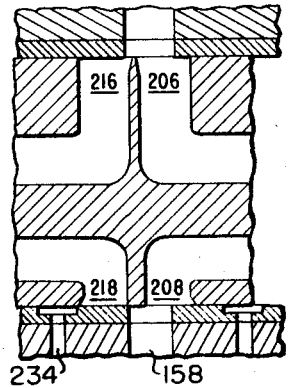

After a predetermined time interval sufficient to insure filling of the clean screen chamber, or upon the appearance of a flow of extrudate at the open end of the vent passage, the carrier is advanced to the position shown in FIG. 23, where the vent closes. At this stage, the discharge port is still closed to the outlet 158, so that the chamber may be brought up to full pressure before being connected into the flow to the die to avoid any discontinuity or variation in the quality of the extruded product.

Figure 24:
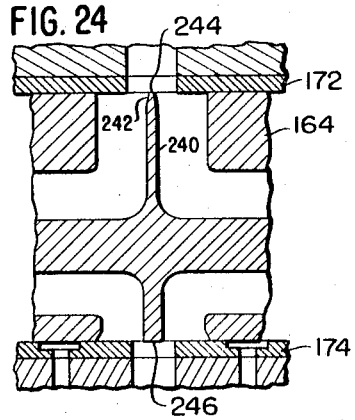

With the clean screen chamber at the operating pressure, the carrier moves on to the half-way position shown in FIG. 24, where the clean screen is operative but some flow still takes place by way of the first chamber.

Figure 25:
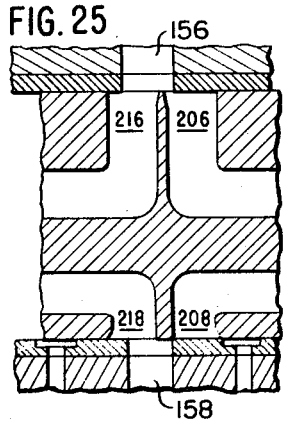
Figure 27:
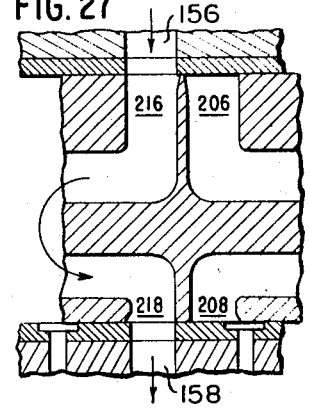

The flow through the second chamber cuts off by the time the carrier reaches the position shown in FIG. 25, and in FIG. 26, the by-pass recess for the first chamber begins to open. In FIG. 27, the changeover is completed, leaving the first screen chamber shut off from the inlet 156 and at atmospheric pressure for safe removal of the screen, by reason of the vent which remains open throughout the time the second screen continues in normal operation.

It will be apparent from the foregoing that applicant has provided screen changer apparatus in which the complete control of the changeover operation is provided by the shifting of the screen carrier relative to the fixed body. By the valving action of the cooperating ports in body and carrier, the flow of extrudate is smoothly shifted from one screen chamber to the other, and in addition all supplementary vent and fill steps are caused to take place at the proper times in each changeover sequence. Through utilization of appropriate configurations and relationships of the cooperating ports at the interface between the fixed body and the movable carrier, the complete control of flow is provided by a single pair of ports in the body, and the cooperating pairs of ports in the carrier that communicate with the respective screen chambers. By this simple and direct valving action, pockets or regions inaccessible for cleaning are avoided, as well as the complication of separate movable valve elements. The illustrative embodiments likewise permit tight sealing engagement between body and carrier so that the apparatus may be maintained in leak free operation over long periods of time involving repeated changes of screens.

While the invention has been described in terms of particular illustrative embodiments, it will be understood that my invention comprehends other forms and arrangements within the scope of the appended claims.

I claim as my invention:

1. A screen changer apparatus for extrusion machines comprising a body having an inlet portion adapted to be connected to an extruder and an outlet portion adapted to be connected to a die, said inlet and outlet portions having inlet and outlet passages, a screen carrier mounted on the body in interfacial sliding contact, an inlet and an outlet port in the body at the interface between body and carrier and communicating with the inlet and outlet passages in the body, pairs of ports in the screen carrier, each of said pairs of ports in the screen carrier successively registering at the interface with the ports in the body upon movement of the carrier relative to the body, a plurality of chambers in the carrier, each chamber communicating with a pair of ports in the carrier, a screen in each chamber in the path of flow from one port in the carrier to the other port of the same pair, means for moving the carrier relative to the body from a position in which one pair of ports in the carrier registers at the interface with the inlet and outlet ports in the body to another position in which a second pair of ports in the carrier registers with the said ports in the body, and cooperating bypass vent passages in communicating relation in the limit positions of the carrier for venting one screen chamber when another screen chamber is in operation.

2. Apparatus according to claim 1 wherein the bypass passages comprises recesses in the body spaced from the outlet port in the body at the interface and wherein the carrier outlet port for one screen chamber communicates with the vent passage by way of a recess in the body when the ports for another screen chamber are in registering position with the ports in the body.

3. Apparatus according to claim 2 wherein each carrier outlet port has a marginal portion that communicates with a bypass recess in the body when the carrier outlet port is closed to the outlet port in the body.

4. Apparatus according to claim 2 wherein the carrier is provided with vent passages extending from the interface to atmosphere, said passages being separated from the carrier outlet ports by lands, a bypass recess in the body connecting an outlet port for one screen chamber to a vent passage on the other side of the land when the carrier ports for another screen chamber register with the ports in the body.

5. Apparatus according to claim 1 wherein, at an intermediate position of the carrier during a changeover from one screen chamber to another, the outlet port for said other chamber is closed to the body outlet port but open to a bypass passage, and the inlet port to said other chamber is partly open to the inlet port in the body.

6. Apparatus according to claim 5 wherein the pairs of ports int he carrier are separated by lands, the land between the carrier inlet ports being narrower than the land between the carrier outlet ports.

7. Apparatus according to claim 6 wherein the margins of the carrier inlet ports in the land region between said ports are bevelled to form a land region narrower than the land between the outlet ports in the carrier.

8. Screen changing apparatus comprising a body having spaced end portions, inlet and outlet passages therein, a cylindrical portion intermediate the end portions, a screen carrier mounted on the cylindrical portion of the body in sliding sealing engagement therewith for limited swinging movement around the body, a pair of flow passages extending through the cylindrical body portion to ports at the cylindrical surface thereof and communicating with the inlet and outlet passages in the body, pairs of flow passages in the screen carrier, the pairs of passages in the screen carrier having pairs of ports successively registering with the ports in the body upon swinging movement of the screen carrier on the body, a plurality of screen chambers associated with the screen carrier, each chamber communicating with a pair of flow passages in the carrier, a screen in each chamber in the path of flow therethrough, and means for moving the screen carrier around the body to place one or another of the screens in the flow path from inlet to outlet.

9. Apparatus according to claim 8, including bypass vent passages in communicating relation in the limit positions of the carrier for venting one screen chamber to atmosphere when another screen chamber is in operation.

10. Apparatus according to claim 9 wherein the bypass passages comprise recesses in the body spaced from the outlet port in the body at the interface and wherein the carrier outlet port for one screen chamber communicates with the vent passage by way of a recess in the body when the ports for another screen chamber are in registering position with the ports in the body.

11. Apparatus according to claim 9 wherein each carrier outlet port has a marginal portion that communicates with a bypass recess in the body when the carrier outlet port is closed to the outlet port in the body.

12. Apparatus according to claim 9 wherein the carrier is provided with vent passages extending from the interface to atmosphere, said passages being separated from the carrier outlet ports by lands, a bypass recess in the body connecting an outlet port for one screen chamber to a vent passage on the other side of the land when the carrier ports for another screen chamber register with the ports in the body.

13. Apparatus according to claim 9 wherein, at an intermediate position of the carrier during a changeover from one screen chamber to another, the outlet port for said other chamber is closed to the body outlet port but open to a bypass passage, and the inlet port to said other chamber is partly open to the inlet port in the body.

14. Apparatus according to claim 13 wherein the pairs of ports in the carrier are separated by lands, the land between the carrier inlet ports being narrower than the land between the carrier outlet ports.

15. Apparatus according to claim 13 wherein the margins of the carrier inlet ports in the land region between said ports are bevelled to form a land region narrower than the land between the outlet ports in the carrier.

16. A screen changer apparatus for extrusion machines comprising a body having an inlet portion adapted to be connected to an extruder and an outlet portion adapted to be connected to a die, the body having opposed spaced wall portions forming a transverse passage therebetween, a screen carrier mounted in said passage for movement transversely of the passage, said screen carrier having faces on opposite sides thereof in sliding sealing engagement with said opposed wall portions of the body, the inlet portion of the body having an inlet passage communicating with an inlet port at a wall portion engaged by one face of the carrier, the outlet portion of the body having an outlet passage communicating with an outlet port at the opposed wall portion engaged by another face of the carrier, pairs of passages in the screen carrier, a plurality of screen chambers in the carrier, each pair of passages comprising an inlet passage to a screen chamber and an outlet passage from the chamber, each inlet passage communicating with an inlet port at one face of the carrier and each outlet passage communicating with an outlet port at the other face of the carrier, means for moving the carrier from a position in which one pair of ports in the carrier registers with the ports in the body to another position in which a second pair of ports in the carrier registers with the said ports in the body, and cooperating bypass vent passages in carrier and body in communicating relation in the limit positions of the carrier for venting one screen chamber when another screen chamber is in operation.

17. Apparatus according to claim 16 wherein the bypass passages comprise recesses in the body spaced from the outlet port in the body at the interface and wherein the carrier outlet port for one screen chamber communicates with the vent passage by way of a recess in the body when the ports for another screen chamber are in registering position with the ports in the body.

18. Apparatus according to claim 17 wherein each carrier outlet port has a marginal portion that communicates with a bypass recess in the body when the carrier outlet port is closed to the outlet port in the body.

19. Apparatus according to claim 17 wherein the carrier is provided with vent passages extending from the interface to atmosphere, said passages being separated from the carrier outlet ports by lands, a bypass recess in the body connecting an outlet port for one screen chamber to a vent passage on the other side of the land when the carrier ports for another screen chamber register with the ports in the body.

20. Apparatus according to claim 16 wherein, at an intermediate position of the carrier during a changeover from one screen chamber to another, the outlet port for said other chamber is closed to the body outlet port but open to a bypass passage, and the inlet port to said other chamber is partly open to the inlet port in the body.

21. Apparatus according to claim 20 wherein the pairs of ports in the carrier are separated by lands, the land between the carrier inlet ports being narrower than the land between the carrier outlet ports.

22. Apparatus according to claim 21 wherein the margins of the carrier inlet ports in the land region between said ports are bevelled to form a land region narrower than the land between the outlet ports in the carrier.

References Cited
UNITED STATES PATENTS

| | | |
|---|---|---|
| 2,838,084 | 6/1958 | Samler. |
| 3,033,256 | 5/1962 | Schrenk. |
| 3,243,849 | 4/1966 | Joukainen. |

J. SPENCER OVERHOLSER, Primary Examiner

U.S. Cl. X.R.

18—12